(12) United States Patent
Laarman

(10) Patent No.: US 10,858,222 B1
(45) Date of Patent: Dec. 8, 2020

(54) COUPLERS WITH PARTIALLY OPEN GATES

(71) Applicant: Christopher Laarman, Newberg, OR (US)

(72) Inventor: Christopher Laarman, Newberg, OR (US)

(*) Notice: Subject to any disclaimer, the term of this patent is extended or adjusted under 35 U.S.C. 154(b) by 0 days.

(21) Appl. No.: 16/850,992

(22) Filed: Apr. 16, 2020

Related U.S. Application Data

(60) Provisional application No. 62/862,883, filed on Jun. 18, 2019.

(51) Int. Cl.
*B66C 1/36* (2006.01)
*F16B 45/02* (2006.01)

(52) U.S. Cl.
CPC ............... *B66C 1/36* (2013.01); *F16B 45/02* (2013.01)

(58) Field of Classification Search
CPC ......... B66C 1/36; F16B 45/02; A44C 5/2019; A44C 5/2033
USPC ........................................... 294/82.17, 82.19
See application file for complete search history.

(56) References Cited

U.S. PATENT DOCUMENTS

| | | | |
|---|---|---|---|
| 171,361 A | 12/1875 | Dudley | |
| 546,226 A * | 9/1895 | Cook | |
| 683,475 A * | 10/1901 | Masters | |
| 688,006 A | 12/1901 | Rickman | |
| 807,212 A * | 12/1905 | Stahl | |
| 1,101,815 A * | 6/1914 | Sandifur | A44C 5/145 24/600.9 |
| 1,113,885 A | 10/1914 | Depollier et al. | |
| 1,745,140 A | 7/1929 | Armbrust et al. | |
| 1,841,423 A | 1/1932 | Wells | |
| 1,995,517 A | 3/1935 | Neugass | |
| 2,052,381 A | 8/1936 | Chernow | |
| 2,135,616 A | 11/1938 | Forstner | |
| 2,992,465 A * | 7/1961 | Gale | B66C 1/36 294/82.14 |
| 3,077,089 A | 2/1963 | Silverman | |
| 3,268,967 A * | 8/1966 | Jordan | B66C 1/36 294/82.17 |
| 3,354,522 A * | 11/1967 | Amon | F16B 45/00 24/600.9 |

(Continued)

FOREIGN PATENT DOCUMENTS

| | | | |
|---|---|---|---|
| DE | 4118945 A1 * | 1/1992 | ............... B66C 1/36 |
| WO | WO2018042419 | 3/2018 | |

*Primary Examiner* — Dean J Kramer
(74) *Attorney, Agent, or Firm* — Mohr Intellectual Property Law Solutions, PC

(57) ABSTRACT

Couplers including a hook and a gate member. The hook includes a base member and a crook. The crook extends from the base member and includes a base leg, a bend, and a hook leg. The base leg extends from the base member. The bend extends in a curved path from the base leg. The hook leg extends from the bend opposite the base leg and terminates in a hook tip. The gate member is coupled to the base member where the gate member extends into the crook and terminates proximate to the hook tip. The gate member is configured to resiliently deflect away from the hook tip when an eye is selectively pressed between and the hook tip and the gate member. The gate member is biased to resiliently return to a position proximate the hook tip once the eye moves past the hook tip.

16 Claims, 6 Drawing Sheets

(56) References Cited

U.S. PATENT DOCUMENTS

| | | | | |
|---|---|---|---|---|
| 3,444,599 | A | * | 5/1969 | Amon ............... F16B 45/02 24/601.2 |
| 4,458,393 | A | | 7/1984 | Pogharian et al. |
| 4,631,785 | A | | 12/1986 | Riethmann |
| 4,679,280 | A | | 7/1987 | Krahenbuhl |
| 5,624,094 | A | * | 4/1997 | Protz, Jr. ............ F16B 45/02 24/375 |
| 6,088,884 | A | | 7/2000 | Hentz |
| 6,308,385 | B1 | | 10/2001 | Ball |
| 6,662,409 | B2 | * | 12/2003 | Benecke ............ B66C 1/125 24/369 |
| 7,926,152 | B2 | | 4/2011 | Emenheiser |
| 8,434,429 | B2 | | 5/2013 | Moeller |
| 9,228,606 | B2 | * | 1/2016 | Dufresne ............ F16B 45/02 |
| 10,039,351 | B2 | | 8/2018 | Allen |
| 2007/0126251 | A1 | * | 6/2007 | Olson ................. F16G 17/00 294/82.17 |
| 2014/0345094 | A1 | | 11/2014 | Keyes et al. |
| 2018/0352917 | A1 | | 12/2018 | Iguchi |

* cited by examiner

COUPLERS WITH PARTIALLY OPEN GATES

CROSS REFERENCE TO RELATED APPLICATIONS

This application claims priority to U.S. Application, Ser. No. 62/862,883, filed on Jun. 18, 2019, which is hereby incorporated by reference for all purposes.

BACKGROUND

The present disclosure relates generally to couplers. In particular, couplers with partially open gates are described.

Couplers are an invaluable mechanical component enabling a wide variety of items to be fastened together. Some couplers are configured to secure two different items together and other couplers are configured to secure different parts of a common item together. Couplers are commonly used in construction job sites, such as with cranes, winches, and other heavy equipment. Couplers also find application in factories, households, and fitness centers. Other common applications for couplers are include securing items with clothing, purses, satchels, and jewelry, such as necklaces, bracelets, earrings, and watches.

There are a wide variety of known coupler designs, but conventional couplers are not entirely satisfactory for the range of applications in which they are employed. For example, existing couplers rely on complicated arrangements of mechanical components, which increase their cost and decrease their reliability. Many couplers are quite small and require significant dexterity to operate, which makes more complex coupler designs even more inconvenient. Conventional couplers seeking to reduce complexity often do so at the expense of coupling effectiveness.

Many conventional couplers include gate members that pivot or translate between open and closed positions. The gate members' relatively large range of travel make them prone to wear, misalignment, and malfunctioning. The gates are most often biased towards a closed position to more securely fasten items together. The closed position of the gate makes selectively decoupling the items more involved and often requires two hands to accomplish. Needing to use two hands is inconvenient and not always feasible.

Further, conventional couplers with fully closing gates present safety hazards. The speed of decoupling a coupler in an emergency situation is paramount. Existing couplers with fully closing gates require significant time to decouple. There exists a need for couplers that decouple more quickly than is possible with conventional couplers from a safety standpoint.

Couplers that forego gates entirely and instead rely on open hook-and-eye coupling suffer from various shortcomings. For instance, gateless or open hook-and-eye couplers are prone to decoupling at times not intended by the user. To reduce incidents of unintentional decoupling, some hook-and-eye couplers increase the size of the hook, which makes the coupler unwieldy and unsuitable for certain applications.

Thus, there exists a need for couplers that improve upon and advance the design of known couplers. Examples of new and useful couplers relevant to the needs existing in the field are discussed below.

Disclosure addressing one or more of the identified existing needs is provided in the detailed description below. Examples of references relevant to couplers include U.S. Patent References: U.S. Pat. Nos. 411,857, 2,052,381, 4,679, 280, US20140345094A1, U.S. Pat. No. 1,113,885, US20180352917A1, U.S. Pat. Nos. 7,926,152, 10,039,351, 688,006, 1,995,517, 8,434,429, 3,077,089, 1,745,140, 2,135, 616, 1,841,423, 2,135,616, and 6,308,385. The complete disclosures of the above patents and patent applications are herein incorporated by reference for all purposes.

SUMMARY

The present disclosure is directed to couplers including a hook and a gate member. The hook includes a base member and a crook. The crook extends from the base member and includes a base leg, a bend, and a hook leg. The base leg extends from the base member. The bend extends in a curved path from the base leg. The hook leg extends from the bend opposite the base leg and terminates in a hook tip. The gate member is coupled to the base member where the gate member extends into the crook and terminates proximate to the hook tip. The gate member is configured to resiliently deflect away from the hook tip when an eye is selectively pressed between and the hook tip and the gate member. The gate member is biased to resiliently return to a position proximate the hook tip once the eye moves past the hook tip.

DETAILED DESCRIPTION

Figure 1:
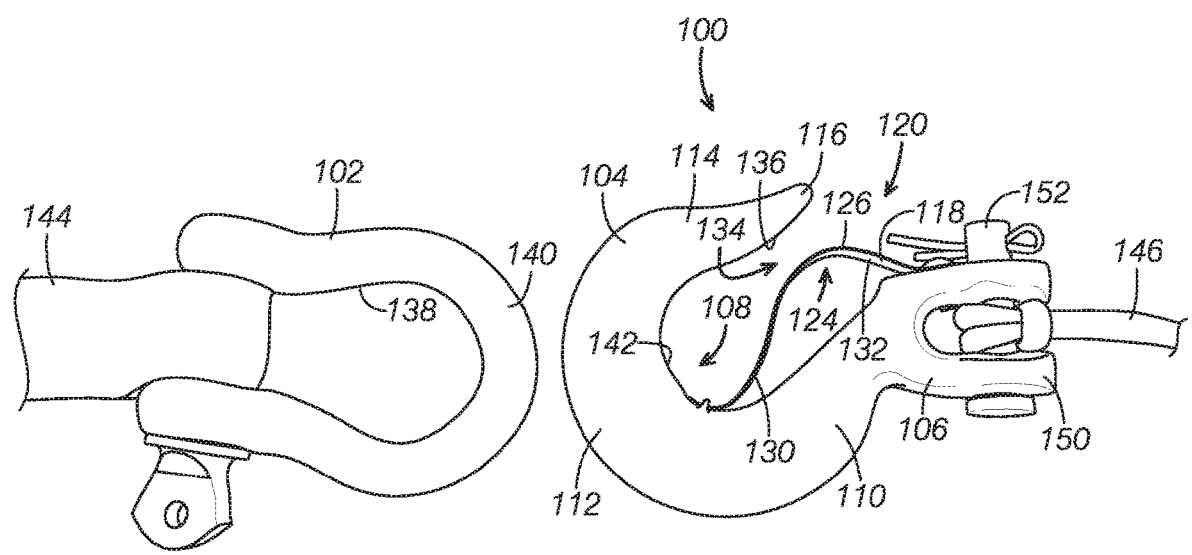
FIG. 1 is a perspective view of a first example of a coupler spaced from an eye.

The disclosed couplers will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various couplers are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example.

The reader should understand that a given feature need not be the same or similar to the specific portrayal of a related feature in any given figure or example.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components.

Couplers with Partially Open Gates

With reference to the figures, couplers with partially open gates will now be described. The couplers discussed herein function to secure components together in a secure and easy to use fashion. The components may be part of the same item or components from separate items.

The couplers described herein may be incorporated into construction equipment, such as cranes, winches, and other heavy equipment. The presently described couplers may also find application in factories, households, and fitness centers. Other applications where the couplers described in this document may be utilized include clothing, purses, satchels, and jewelry, such as necklaces, bracelets, earrings, and watches. The couplers disclosed herein may be used in a wide variety of other applications as well.

The presently described couplers address the shortcomings existing with conventional couplers. For example, the couplers described herein are comparatively and advantageously simplified over the often overly complex designs of known couplers. By avoiding complicated arrangements of mechanical components, the couplers described in this application avoid the associated cost increases and reliability issues present with conventional coupler designs.

The relatively simple construction and operation of the currently described couplers makes them easier to operate. Unlike known couplers that sacrifice effectiveness and reliable hold in an attempt to make them simpler to operate, the presently described fasteners are easy to operate and quite effective at holding components together reliably.

In contrast to conventional couplers that rely on gate members moving between fully open and closed positions, the couplers described herein are configured with gates that maintain a partially open position. The gate members of the couplers described below need not move relatively long distances between fully open and fully closed positions, which simplifies their design and makes them more reliable. The partially open configuration also makes it easier and faster to selectively couple and decouple components together. The couplers described herein can be configured for one-handed operation, making them even more convenient to use than conventional couplers.

By including a gate member in a partially open configuration, the couplers described in this document avoid the reliability challenges faced by couplers that lack gate members. Unlike known couplers that lack a gate member and that are prone to inadvertently decouple during unintended times, the present couplers securely hold components together until a user intentionally elects to decouple them. By providing an elegant and simple gate member solution, the current couplers described below avoid the drawbacks of more elaborate attempts to hold items together without a gate member. Likewise, the present designs avoid the need for a large sized hook that some conventional designs rely on to more securely hold items together.

Contextual Details

Ancillary features relevant to the couplers described herein will first be described to provide context and to aid the discussion of the couplers.

Eye

Mechanical components known as eyes are relevant to the couplers described herein because the couplers are configured to couple with an eye, such as eye 102. Eye 102 and coupler 100 are complementarily configured for selective engagement known as hook-and-eye coupling. Eyes are typically loadbearing members coupled to an end of a first elongate tension bearing member to facilitate selective coupling of the first elongate tension bearing member with a second elongate tension bearing member coupled to a coupler.

Figure 2:
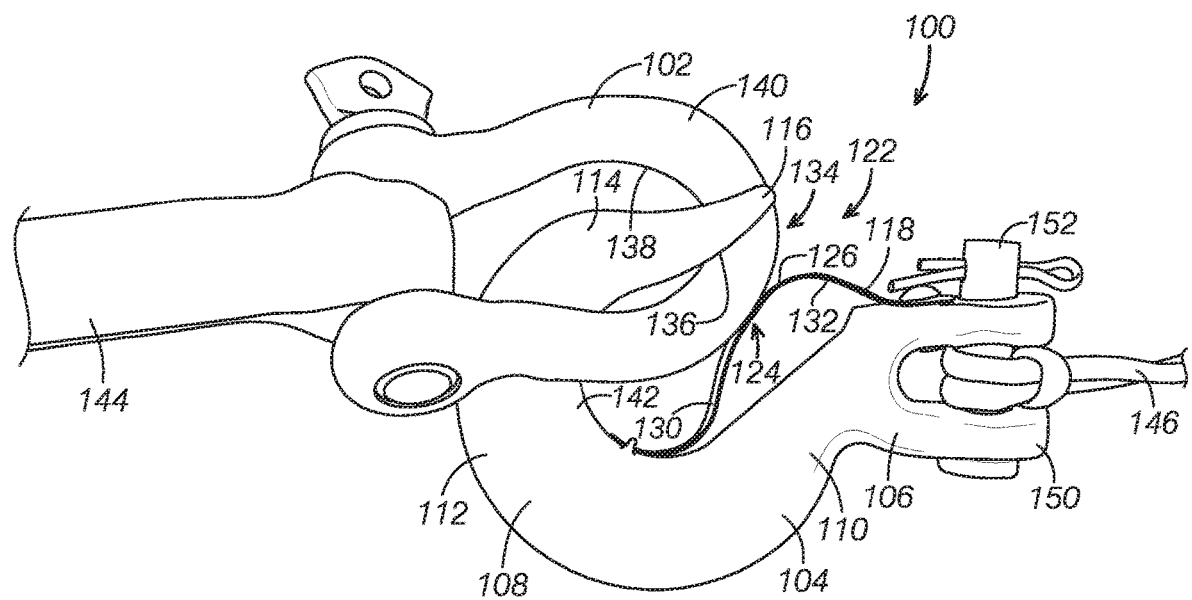
FIG. 2 is a perspective view of the coupler shown in FIG. 1 engaged with the eye, the eye being disposed between the tip of the hook and the gate member and pressing the gate member away from the tip of the hook.
Figure 3:
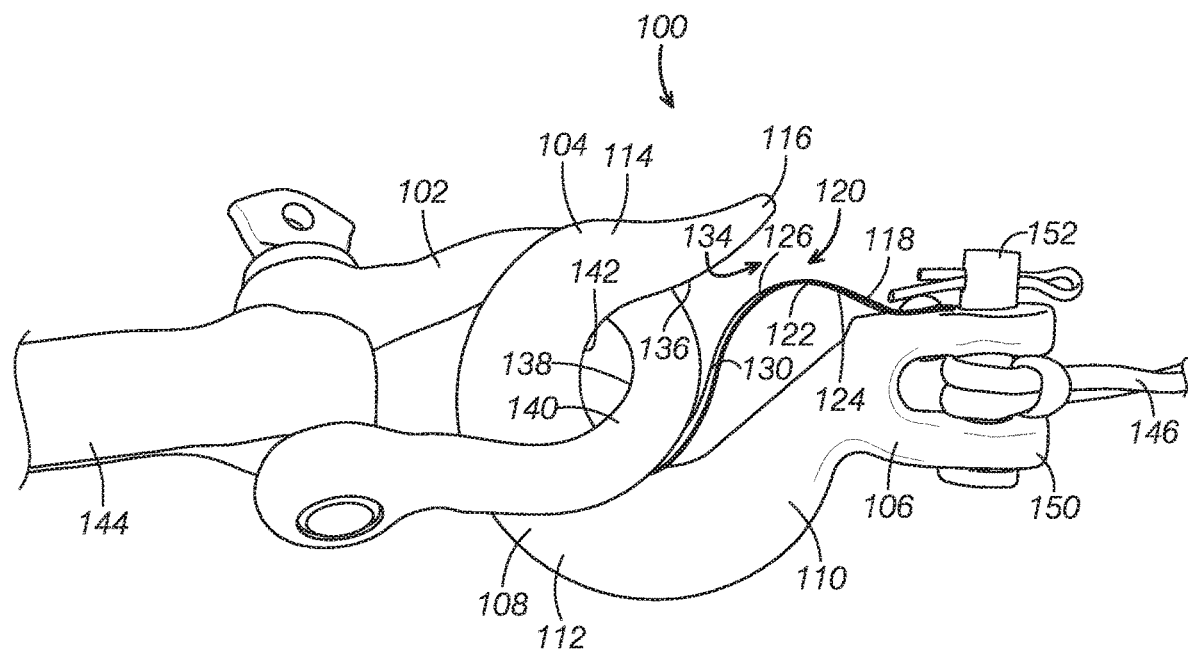
FIG. 3 is a perspective view of the coupler shown in FIG. 1 engaged with the eye, the eye being disposed in the seat of the hook and the gate member returned to a position proximate the tip of the hook.

As shown in FIGS. 1-3, eye 102 defines an eye opening 138 and includes a cross member 140 with a curved outer profile. Portions of the couplers described herein are configured to insert into eye opening 138. In some examples, the eye opening is circular while the eye opening is a different shape in other examples, such as square, rectangular, another regular polygon, or an irregular shape.

The eye may be any currently known or later developed type of eye suitable for hook-and-eye coupling. The eye may be formed from any suitable material, including metal, plastic, wood, ceramics, and composite materials.

Elongate Tension Bearing Member

Elongate tension bearing members are often used with hook-and-eye couplers and may be advantageously used with the couplers described herein. In some examples, an eye is attached to an end of a first elongate tension bearing member and a coupler is attached to an end of a second elongate tension bearing member. Selectively coupling the coupler and the eye functions to couple the first and second elongate tension bearing members. In certain examples, first and second elongate tension bearing members are integrally coupled to one another and/or define ends of a single elongate tension bearing member.

Figure 4:
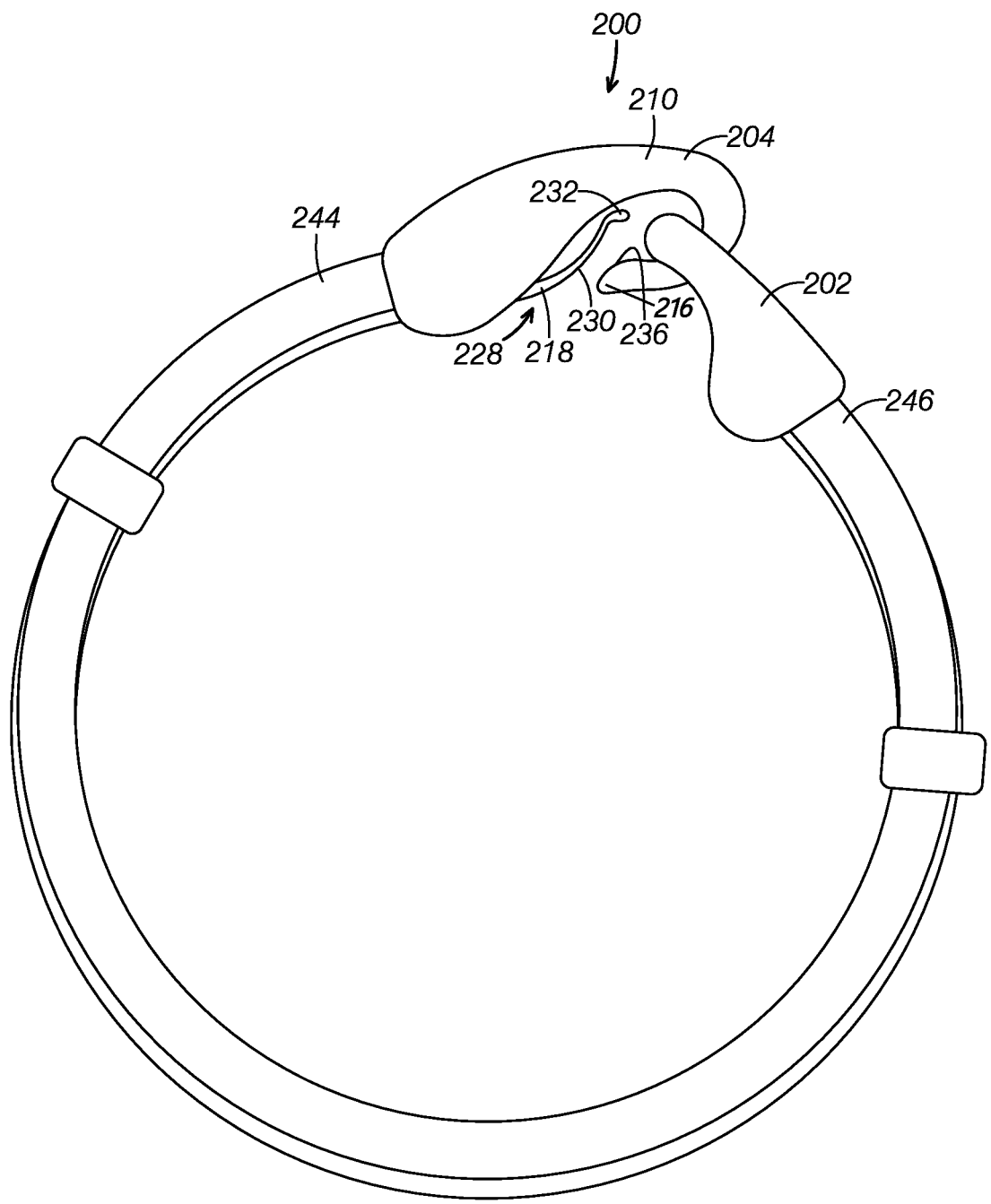
FIG. 4 is a side elevation view of a second example of a coupler engaged with an eye, the coupler including a cantilevered gate member and coupling to strap also coupled to the eye to define a bracelet.

For example, as shown in FIG. 4, an eye 202 is coupled to a first elongate tension bearing member 244 and a hook 204 is coupled to a second elongate tension bearing member 246. In the example shown in FIG. 4, first elongate tension bearing member 244 and second elongate tension bearing member 246 are integrally coupled to define a single elongate tension bearing member in the form of a bracelet.

Elongate tension bearing members used in conjunction with the couplers described herein may be any currently known or later developed type of elongate tension bearing member, such as ropes, cords, strings, chains, and cables. The elongate tension bearing member may be heavy duty and configured to bear heavy tension loads, such as in construction applications for the presently described couplers, or may be delicate and light weight, such as in jewelry applications for the couplers described below.

Coupler Embodiment One

With reference to FIGS. 1-3, a first example of a coupler, coupler 100, will now be described. Coupler 100 includes a hook 104 and a gate member 118. In some examples, the coupler does not include one or more features included in coupler 100. In other examples, the coupler includes additional or alternative features, such as an eye and/or one or more elongate tension bearing members.

Hook

Hook 104 functions to selectively engage or couple with eye 102 by inserting into eye opening 138. Eye 102 is coupled to a first elongate tension bearing member 144. As can be seen in FIGS. 1-3, hook 104 includes a base member 106 and a crook 108.

In the example shown in FIGS. 1-3, base member 106 is coupled to a second elongate tension bearing member 146. The reader can see in FIGS. 1-3 that base member 106 includes a forked bearing 150 and a pin 152 pivotally mounted to forked bearing 150. Other base member examples are configured differently, such as a simple post, a fixed mounting point, a recess, or a ring.

Base member 106 couples to second elongate tension bearing member 146 by second elongate tension bearing member 146 wrapping around pin 152 to form a secure knot. However, any manner of coupling the base member to the second elongate tension bearing member may be used, such as clamping, adhering, fastening, or magnetically coupling the components together.

As can be seen in FIGS. 1-3, crook 108 extends from base member 106. In the example shown in FIGS. 1-3, crook 108 includes a base leg 110, a bend 112, and a hook leg 114. In the present example, base leg 110, bend 112, and hook leg 114 are integrally coupled. In other examples, they are discrete components coupled together by suitable means.

With reference to FIGS. 1-3, base leg 110 extends from base member 106. As shown in FIGS. 1-3, bend 112 extends in a curved path from base leg 110. Hook leg 114 extends from bend 112 opposite base leg 110. As can be seen in FIGS. 1-3, hook leg 114 terminates in a hook tip 116.

In the example shown in FIGS. 1-3, hook tip 116 tapers to a relatively narrow tip. In the example shown in FIG. 4, hook tip 216 is bulbous. In other examples, the hook tip is not bulbous and does not otherwise taper or flare relative to the rest of the hook leg. The reader can see in FIGS. 1-3 that hook tip 116 defines a hook tip apex 136.

As shown in FIGS. 1-3, base leg 110 and hook leg 114 are spaced a distance selected to enable eye 102 to move within crook 108. Bend 112 is curved to complement the curved outer profile of cross member 140 of eye 102. Bend 112 being curved to complement cross member 140 serves to define a bearing surface 142 against which eye 102 may rotate.

The width of hook leg 114 is selected to complement a corresponding dimension of eye opening 138. The width of hook leg 114 complementing a corresponding dimension of eye opening 138 functions to limit eye 102 moving laterally when hook leg 114 is inserted into eye opening 138.

Gate Member

Gate member 118 functions to selectively restrict and allow eye 102 to couple with hook 104. As shown in FIGS. 1-3, gate member 118 is configured to resiliently deflect away from hook tip 116 to an access position 122 when eye 102 is selectively pressed between and hook tip 116 and gate member 118. As shown in FIG. 3, gate member 118 is biased to resiliently return to a restriction position 120 once eye 102 moves past hook tip 116 towards bend 112 of crook 108.

In the example shown in FIGS. 1-3, gate member 118 is coupled to base member 106. Gate member 118 extends into crook 108 and terminates proximate to hook tip 116. When gate member 118 is not subject to an external deflecting force, it's position in hook 104 defines restriction position 120. When gate member is subject to an external deflecting force from eye 102 being selectively pressed between and hook tip 116 and gate member 118, gate member 118 moves to access position 122.

As can be seen in FIGS. 1-3, gate member 118 defines an arch 124. Arch 124 includes an arch apex 126. In the example shown in FIGS. 1-3, arch apex 126 is proximate hook tip 116.

Arch apex 126 being proximate hook tip 116 functions to reduce the size of a gap between gate member 118 and hook leg 114. In the example shown in FIGS. 1-3, gate member 118 and hook tip 116 define passageway gap 134 between them. Gate member 118 is mounted to base member 106 in a position where passageway gap 134 is smaller than a corresponding dimension of eye 102. Gate member 118 and hook tip 116 cooperating to make passageway gap 134 smaller than a corresponding dimension of eye 102 functions to restrict eye 102 from passing through passageway gap 134 without deflecting gate member 118.

In the example shown in FIGS. 1-3, gate member 118 defines a leaf spring. Gate member 118 is configured to require a threshold deflection force to deflect it away from hook leg 114 to access position 122 to permit eye 102 to enter or exit hook 104. The threshold deflection force is selected to require an external force pressing eye 102 against gate member 118 to exceed the threshold deflection force.

The threshold deflection force may be selected to reduce or prevent the eye from entering or exiting the hook when not intended. Avoiding unintended decoupling of the hook and eye is an important safety consideration. In some examples, the threshold deflection force requires mechanical assistance to exceed, such as in heavy equipment applications.

The threshold deflection force may also be selected to cause the gate member to move to the access position when the coupler is subject to larger than planned force. For example, a dog's collar may be coupled with a coupler described herein and the threshold deflection force may be selected to cause the gate member to move to the access position to promote the coupler decoupling when the collar is subject to a force that could injure the dog. Breakaway decoupling for safety considerations can be achieved by selecting an appropriate threshold deflection force for the gate member.

In the example shown in FIGS. 1-3, gate member 118 includes an elongate body 130 and a head 132. Elongate body 130 is coupled to base member 106, and head 132 is integrally coupled to elongate body 130 distal base member 106. In the example shown in FIGS. 1-3, head 132 couples to base leg 110. In other examples, the head is spaced from the base leg and the gate member defines a cantilever.

Additional Embodiments

The discussion will now focus on additional coupler embodiments. The additional embodiments include many similar or identical features to coupler 100. Thus, for the sake of brevity, each feature of the additional embodiments below will not be redundantly explained. Rather, key distinctions between the additional embodiments and coupler 100 will be described in detail and the reader should reference the discussion above for features substantially similar between the different coupler examples.

Second Embodiment

Turning attention to FIG. 4, a second example of a coupler, coupler 200, will now be described. As can be seen in FIG. 4, coupler 200 includes a hook 204 and a gate member 218.

A distinction between coupler 200 and coupler 100 is that head 232 of gate member 218 is spaced from base leg 210 rather than coupled to base leg 210 like with gate member 118. In the FIG. 4 example, gate member 218 defines a cantilever 228. As shown in FIG. 4, gate member 218 terminates proximate to hook tip apex 236.

Other distinctions exist between head 232 and head 132, including shape distinctions. For example, head 232 flares out relative to elongate body 230 in contrast to head 132, which does not taper or flare relative to elongate body 130. Head 232 flaring out relative to elongate body 230 functions to reduce interference with an eye moving past head 232.

Another distinction is that head 232 is thinner than elongate body 230 in the FIG. 4 example. In the example shown in FIGS. 1-3, head 132 was substantially the same thickness as elongate body 130. Head 232 being thinner than elongate body 230 functions to reduce interference with an eye moving past head 232.

Third Embodiment

Figure 5:
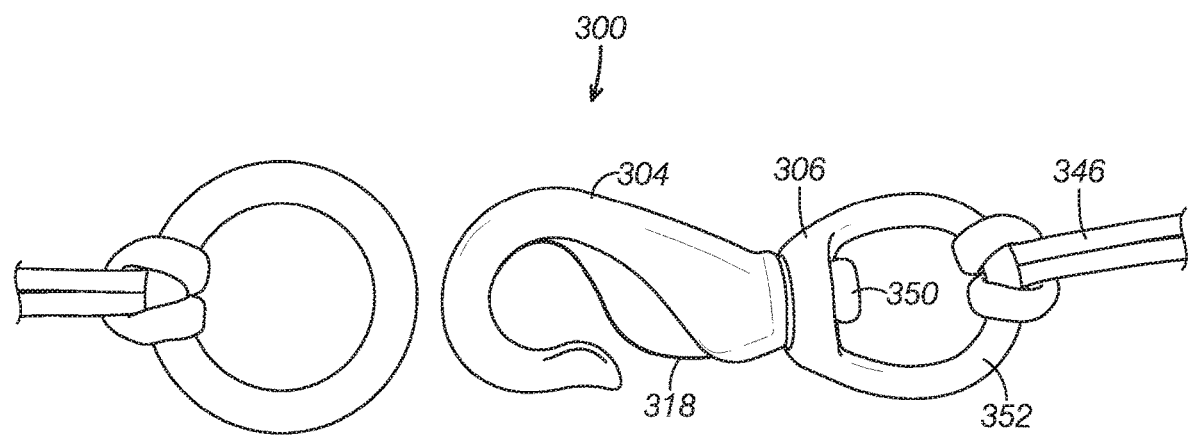
FIG. 5 is side view of a third coupler example, the coupler including a hook rotationally mounted to a base.

Turning attention to FIG. 5, a third example of a coupler, coupler 300, will now be described. As can be seen in FIG. 5, coupler 300 includes a hook 304 and a gate member 318.

A distinction between coupler 300 and coupler 100 is that base member 306 defines a bearing shaft 350 and a ring 352 is rotationally mounted to bearing shaft 350 of base member 306. Ring 352 couples to an elongate tension bearing member 346. Ring 352 being rotationally mounted to base member 306 enables coupler 300 to rotate relative to ring 352 and elongate tension bearing member 346.

Fourth Embodiment

Figure 6:
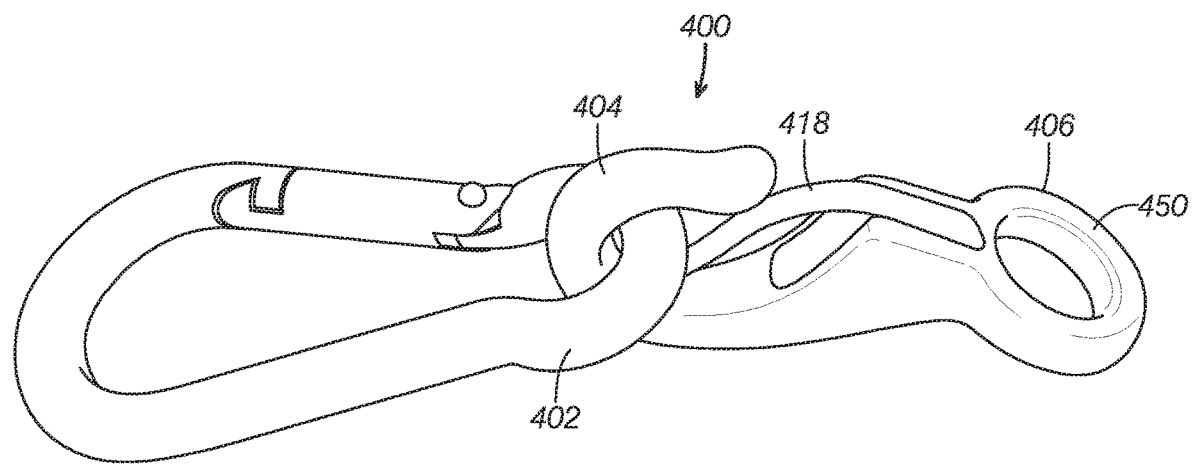
FIG. 6 is a perspective view of a fourth coupler example, the coupler being coupled to an eye defining a carabineer clip.

Turning attention to FIG. 6, a fourth example of a coupler, coupler 400, will now be described. As can be seen in FIG. 6, coupler 400 includes a hook 404 and a gate member 418.

A distinction between coupler 400 and coupler 100 is that base member 406 defines a fixed ring 450 configured to couple with an elongate tension bearing member rather than defining forked bearing 150 or bearing shaft 350. The reader can also see in FIG. 6 that eye 402 is incorporated into a carabineer clip.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A coupler configured to couple with an eye, the coupler comprising:
   a hook including:
      a base member; and
      a crook extending from the base member, the crook including:
         a base leg extending from the base member,
         a bend extending in a curved path from the base leg, and
         a hook leg extending from the bend opposite the base leg and terminating in a hook tip; and
   a gate member fixed to the base member in a position where the gate member extends into the crook along the length of the crook from the base leg towards the bend to define a guide surface for the eye and terminates proximate to the hook tip in a restriction position;
   wherein:
      the gate member is configured to resiliently deflect away from the hook tip to an access position when the eye is selectively pressed between and the hook tip and the gate member;
      the gate member is biased to resiliently return to the restriction position once the eye moves past the hook tip towards the bend of the crook;
      the gate member and the hook tip define a passageway gap between them when the gate member is in the restriction position; and
      the gate member rests in the restriction position until selectively deflected away from the restriction position;
      the gate member includes:
         an elongate body coupled to the base member, and
         a head coupled to the elongate body distal the base member;
      the head flares out relative to the elongate body to reduce interference with the eye moving past the head; and
      the head is thinner than the elongate body to reduce interference with the eye moving past the head.

2. The coupler of claim 1, wherein the gate member defines an arch with an arch apex.

3. The coupler of claim 2, wherein the arch apex is proximate the hook tip.

4. The coupler of claim 1, wherein the gate member defines a cantilever.

5. The coupler of claim 1, wherein the head couples to the base leg.

6. The coupler of claim 1, wherein the head is spaced from the base leg.

7. The coupler of claim 1, wherein the head is integrally coupled to the elongate body.

8. The coupler of claim 1, wherein the gate member defines a leaf spring.

9. The coupler of claim 1, wherein:
the gate member is mounted to the base member in a position where the passageway gap is smaller than a corresponding dimension of the eye to restrict the eye from passing through the passageway gap without deflecting the gate member.

10. The coupler of claim 9, wherein:
the gate member is configured to require a threshold deflection force to deflect; and
the threshold deflection force is selected to require an external force pressing the eye against the gate member to exceed the threshold deflection force.

11. The coupler of claim 1, wherein the hook tip is bulbous.

12. The coupler of claim 11, wherein:
the hook tip defines a hook tip apex; and
the gate member terminates proximate to the hook tip apex.

13. The coupler of claim 1, wherein the base leg and the hook leg are spaced a distance selected to enable the eye to move within the crook.

14. The coupler of claim 1, wherein:
the eye defines an eye opening; and
the width of the hook leg is selected to complement a corresponding dimension of the eye opening to limit the eye moving laterally when the hook leg is inserted into the eye opening.

15. The coupler of claim 1, wherein:
the eye includes a cross member with a curved outer profile;
the bend is curved to complement the curved outer profile of the cross member to define a bearing surface against which the eye may rotate.

16. A coupler, comprising:
an eye configured to couple to a first elongate tension bearing member, the eye defining an eye opening,
a hook configured to selectively couple to the eye and to couple with a second elongate tension bearing member including:
a base member; and
a crook extending from the base member, the crook including:
a base leg extending from the base member,
a bend extending in a curved path from the base leg, and
a hook leg extending from the bend opposite the base leg and terminating in a hook tip, the hook leg being complementarily configured with the eye opening to insert into the eye opening, and
a gate member fixed to the base member in a position where the gate member extends into the crook along the length of the crook from the base leg towards the bend to define a guide surface for the eye and terminates proximate to the hook tip in a restriction position;
wherein:
the gate member is configured to resiliently deflect away from the hook tip to an access position when the eye is selectively pressed between and the hook tip and the gate member;
the gate member is biased to resiliently return to the restriction position once the eye moves past the hook tip towards the bend of the crook;
the gate member and the hook tip define a passageway gap between them when the gate member is in the restriction position; and
the gate member rests in the restriction position until selectively deflected away from the restriction position;
the first elongate tension bearing member is integrally coupled to the second elongate tension bearing member.

* * * * *